Sept. 4, 1923.
J. H. HAMMOND, JR
1,467,154
SYSTEM OF RADIO DIRECTIVE CONTROL
Original Filed June 7, 1912
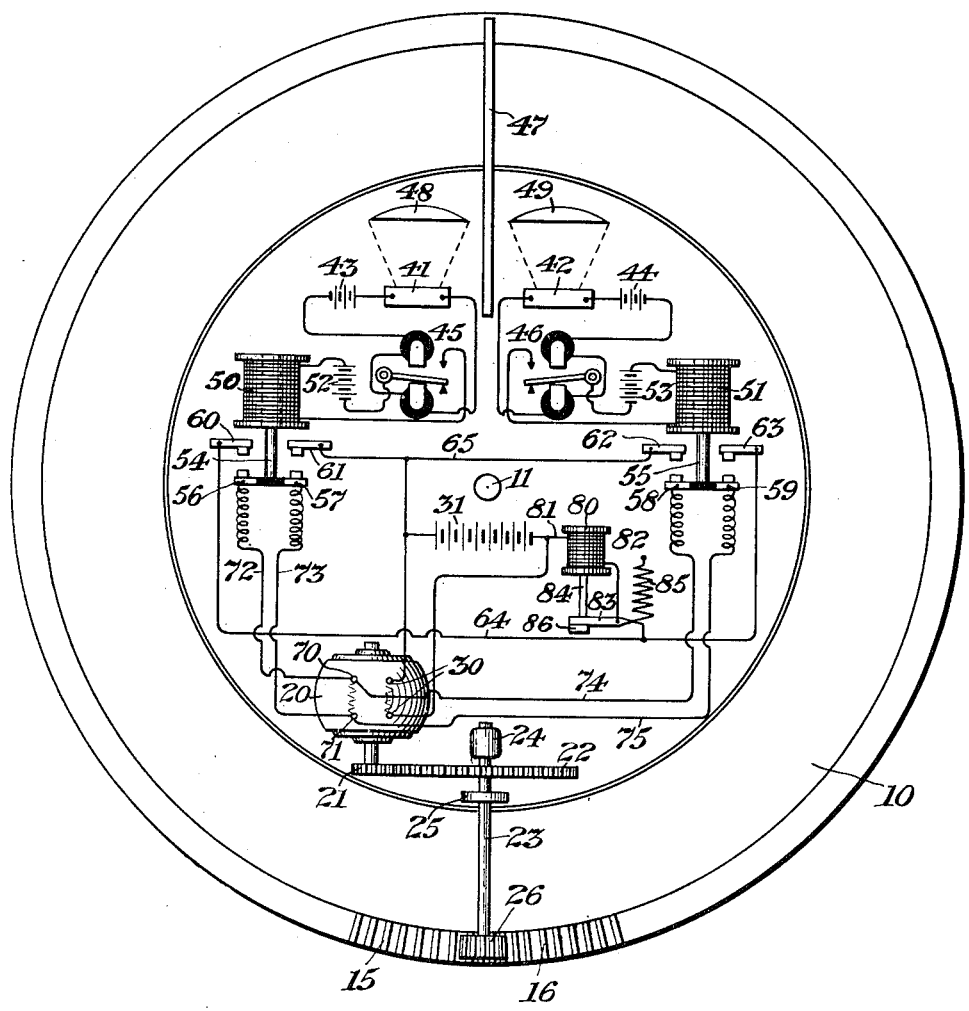
WITNESS
Chas. F. Clagett
INVENTOR
John Hays Hammond Jr.
By A. J. Gardner
HIS ATTORNEY Patented Sept. 4, 1923.

1,467,154

UNITED STATES PATENT OFFICE.

JOHN HAYS HAMMOND, JR., OF GLOUCESTER, MASSACHUSETTS.

SYSTEM OF RADIO-DIRECTIVE CONTROL.

Original application filed June 7, 1912, Serial No. 702,174. Renewed January 18, 1921, Serial No. 438,260. Patent No. 1,387,850, dated August 16, 1921. Divided and this application filed August 19, 1919, Serial No. 318,572. Renewed January 31, 1923.

*To all whom it may concern:*

Be it known that I, JOHN HAYS HAMMOND, Jr., a citizen of the United States, residing at Gloucester, in the State of Massachusetts, have invented certain new and useful Improvements in Systems of Radio-Directive Control, of which the following is a specification, this application being a division of my application Serial No. 702,174, filed June 7, 1912.

This invention relates to improvements in systems in which the movements of bodies or mechanisms are controlled or directed by radiant energy, such as light waves, radiant heat waves, ultra violet waves or electric waves. More particularly my invention relates to methods and apparatus by which a moveable body, such, for instance, as a boat, air craft, vehicle, or revolving lighthouse may be made to move or to face in the direction of a source of radiant energy.

In the present embodiment of my invention, the essential features are two receivers of radiant energy, which may be of any suitable form, such as selenium cells, bolometers, or directive electric wave receivers, according to the nature of the radiation which is to affect them. These receivers of radiant energy, by means of electrical and other apparatus, control the mechanisms which cause a movable body to face in certain directions, and they are so placed that when both are affected in approximately equal amounts by the radiant energy, the said movable body will face in a normal direction, say directly toward the source of energy, but when either receiver is more strongly affected by the radiant energy than the other, then the said apparatus and mechanisms will cause the movable body to face so that both receivers will be again equally affected.

The accompanying drawing is a diagrammatic top plan view of one form of this invention.

Referring to the drawing, one embodiment of this invention comprises a circular turntable 10 which is mounted upon a pivot 11 to swing in a fixed plane about a fixed axis. Surrounding and coaxial with the turntable 10 is a fixed circular rack 15, the entire upper surface of which is provided with radial teeth 16.

For rotating the turntable 10 about pivot 11 with respect to the rack 15, an electric motor 20 is mounted upon the turntable 10 and is arranged to rotate a pinion 21 which engages a gear 22 fixed upon a shaft 23 which is arranged to rotate about an axis fixed with respect to the turntable 10 in bearings 24 and 25 fixed upon the turntable 10. The shaft 23 is arranged radially with respect to the turntable 10 and has fixed upon its outer end a pinion 26 which engages the rack 15. For energizing the motor 20, the field terminals 30 of the motor are in circuit with a battery 31, or other source of electric energy.

For controlling the operation of the motor 20 to cause the turntable 10 to be rotated either in one direction or in the opposite direction, or to be permitted to remain stationary, as the case may be, in response to radiant energy, particularly in response to light rays from a source of light 40, 40' or 40", a receiving system for light rays is mounted upon the turntable 10. One form of this system comprises, as shown in the drawing, two selenium cells 41 and 42 which are connected in series respectively with two batteries 43 and 44 and two relays 45 and 46. Fixed upon the turntable 10 and arranged between the two selenium cells 41 and 42 is an opaque screen 47. Two condensing lenses 48 and 49 are fixed upon the turntable 10 in front of the two selenium cells 1 and 2 respectively. The two relays 45 and 46 control respectively two circuits, including respectively two solenoids 50 and 51, and two batteries 52 and 53. The two solenoids 50 and 51 control two coils 54 and 55 which carry respectively two pairs of insulated contacts 56, 57 and 58, 59. These two pairs of contacts are arranged to be moved into or out of engagement respectively with two pairs of fixed terminals 60, 61 and 62, 63, the two fixed terminals 60 and 63 being connected by conductor 64, and the other two fixed terminals 61 and 62 being connected by a conductor 65.

The motor 20 is provided with an armature having two armature terminals 70 and 71, which are connected by conductors 72 and 73 to the two movable contacts 56 and 57, and by conductors 74 and 75 to the other two movable contacts 58 and 59.

For preventing an excessive loss of energy from the battery 31, under some conditions, a solenoid 80 is mounted upon the turntable 10 and has one end of its winding connected through a conductor 81 to the negative pole of the battery 31, and the other end of its winding connected by conductor 82 to a movable contact 83, which is fixed upon a rod 84 which forms a core controlled by the solenoid 80. The movable contact 83 is arranged to contact in its path of movement with various points of a variable resistance 85 which is connected to the conductor 64, and to rest normally on a fixed stop 86.

In the operation of this form of the invention, when the selenium cells 41 and 42 are equally illuminated from the source 40 through the lenses 48 and 49 respectively, the resistance of the cells 41 and 42 is decreased and the relays 45 and 46 are operated by the increase in current flowing through them from the batteries 43 and 44 respectively. The relay 45 closes the circuit containing the battery 52 and solenoid 50, thus drawing the movable contacts 56 and 57 into engagement with the stationary contacts 60 and 61. In a similar manner the relay 46 closes the circuit through the battery 53 and solenoid 51 and moves the movable contacts 58 and 59 into engagement with the stationary contacts 62 and 63. When the parts are thus positioned the battery 31 will be shortcircuited throughout the solenoid 82 and the resistance 85, and the motor armature terminals 70 and 71 will be shunted through the solenoid 82 and the motor 20 will remain stationary or inoperative. Under these conditions the circuit would run from the positive pole of the battery 31 to the contact 61, to the lower armature terminal 71, through 75 to the movable contact 59, through the fixed contact 63 and through the resistance 85 to the contact finger 83 and through solenoid 82 and conductor 81 to the negative pole of the battery 31. Another circuit would run from the positive pole of the battery 31, through conductor 65, stationary contact 62, movable contact 58, conductor 74 through the upper armature terminal 70, conductor 72, stationary contact 60, conductor 64, resistance 85, solenoid 82 and conductor 81 to the negative pole of the battery 31. The battery 31 would be thus shortcircuited through the solenoid 80 and the increased attraction thus produced upon the core 84 would cause the contact finger 83 to be moved upwardly along the resistance 85, thus adding resistance to the circuit through the battery 31 and thereby preventing excessive loss of energy from the battery. The resistance 85 is of such value that the current passing through it does not greatly exceed the current required by the armature of the motor 20 when in operation.

If now, the source of light 40 should be removed to the position 40' the lens 49 would be shaded and the relay 46 and solenoid 51 would be de-energized, thus permitting the core 55 to move downwardly and thus disengage the contacts 58 and 59 from the contacts 62 and 63, and the motor armature terminals 70 and 71 and the battery 31 would no longer be short circuited. The core 84 would then fall to its lowermost position into engagement with the stop 86 cutting out most of the resistance 85, and the motor 20 would then be rotated to rotate the turntable 10 in a clockwise direction. In a similar manner if the source of light 40 should be moved to the position shown in the dotted line at 40', the turntable 10 would be rotated in a counter clockwise direction.

It is to be understood that this invention is not limited to the specific construction shown, but might be employed in various forms without department from the spirit of the invention or the scope of the appended claims.

Having described this invention I claim:

1. The combination with a body rotatable about a predetermined axis, of a motor carried by said body, means carried by said body and responsive to radiant energy for controlling said motor, a relatively stationary element, and means actuated by said motor and engaging said stationary element to rotate said body about said axis.

2. The combination with a body arranged to rotate about a fixed axis, of a motor carried by said body, and means responsive to radiant energy from a given source to cause said motor to be rotated either in one direction or in an opposite direction selectively, depending upon the relative positions of said source and said body.

3. The combination with a turn table, a fixed member serving as an axis of rotation for said table, means to turn said table in either direction about said fixed member, a pair of elements carried by said table and responsive to radiant energy from a given source, said elements being responsive in different degrees respectively to said energy depending upon the orientation of said turn table with respect to said source, and means controlled by said elements for controlling said table turning means.

4. The combination with a turn table, a fixed member serving as an axis of rotation for said table. a circular fixed rack encircling said table, means including a pinion meshing with said rack for turning said table in either direction about said fixed member, a pair of elements carried by said table and responsive to radiant energy from a given source, said elements being responsive in different degrees respectively to said energy depending upon the orientation of said turn table with respect to said source, and means controlled by said elements for controlling said table turning means.

5. In a receiving system for radiant energy, the combination with a body arranged to be rotated about a fixed axis, of a plurality of elements carried thereby and constructed and arranged to respond simultaneously to the same series of radiant waves from a given source in different degrees respectively depending upon the orientation of said receiving system with respect to said source, and means operatively connected to all of said elements and controlled thereby as a result of the simultaneous energization of said elements by said series of waves to produce at different times different effects depending upon the orientation of said elements with respect to said source.

6. The combination with a body rotatable about a fixed axis, of a plurality of elements responsive to radiant energy carried by said body and constructed and arranged to respond simultaneously to the same series of radiant waves from a given source in different degrees respectively depending upon the orientation of said body with respect to said source, and means operatively connected to and controlled by said elements as a result of the simultaneous energization of said elements by said waves for rotating said body about said axis with respect to said source.

7. The combination with a body rotatable about a fixed axis, of a plurality of elements responsive to radiant energy carried by said body and constructed and arranged to respond simultaneously to the same series of radiant waves from a given source in different degrees respectively depending upon the orientation of said body with respect to said source, and means operatively connected to and controlled by said elements as a result of the simultaneous energization of said elements by said waves for rotating said body with respect to said source either in one direction or in a contrasting direction about said axis depending upon the distribution of the energy of said waves among said elements.

8. In a receiving system for radiant energy, the combination with a plurality of elements responsive to radiant energy and arranged to respond simultaneously to the same series of radiant waves from a given source in different degrees respectively depending upon the orientation of said elements with respect to said source, and an element rotative about a fixed axis and operatively connected to all of said first mentioned elements and arranged to be controlled as a result of the simultaneous energization of said first mentioned elements by said series of waves so as to move said rotative element either in one direction or in an opposite direction about said axis depending upon the distribution of energy of said waves among said first mentioned elements.

9. The combination with an element arranged to be rotated about a fixed axis, of a motor, and means cooperating therewith for causing said motor to rotate said element about said axis, and means for controlling said motor from a distance in response to radiant energy including a plurality of wave responsive devices carried by said element and arranged to respond simultaneously to a series of waves from a given source in varying degrees respectively depending upon the orientation of said element with respect to said source, and means controlled by said devices for causing said motor to be rotated either in one direction or in the opposite direction to rotate said element accordingly about said axis depending upon the distribution of energy among said wave responsive devices.

Signed at New York in the county of New York and State of New York this 6th day of August, A. D. 1919.

JOHN HAYS HAMMOND, Jr.